(12) United States Patent
Vanghi

(10) Patent No.: US 6,711,150 B1
(45) Date of Patent: Mar. 23, 2004

(54) SYSTEM AND METHOD FOR DATA BURST COMMUNICATIONS IN A CDMA NETWORK

(75) Inventor: Vieri Vanghi, San Diego, CA (US)

(73) Assignee: Telefonktiebolaget L.M. Ericsson (SE)

( * ) Notice: Subject to any disclaimer, the term of this patent is extended or adjusted under 35 U.S.C. 154(b) by 0 days.

(21) Appl. No.: 09/545,635

(22) Filed: Apr. 7, 2000

(51) Int. Cl.[7] .............................................. H04B 7/216
(52) U.S. Cl. ...................... 370/342; 370/252; 370/311; 370/318; 370/333; 375/130; 455/69; 455/522
(58) Field of Search ................................ 370/252, 311, 370/320, 331, 332, 333, 335, 338, 342, 310, 318; 375/130; 455/69, 440, 442, 443, 522

(56) References Cited

U.S. PATENT DOCUMENTS

| | | | | |
|---|---|---|---|---|
| 5,056,109 A | * | 10/1991 | Gilhousen et al. | 375/130 |
| 5,745,520 A | * | 4/1998 | Love et al. | 375/130 |
| 6,047,165 A | * | 4/2000 | Wright et al. | 455/66 |
| 6,373,823 B1 | * | 4/2002 | Chen et al. | 370/252 |
| 6,529,482 B1 | * | 3/2003 | Lundby | 370/252 |
| 2003/0099209 A1 | * | 5/2003 | Laakso et al. | 370/311 |

* cited by examiner

Primary Examiner—Dang Ton
Assistant Examiner—Shick Hom
(74) Attorney, Agent, or Firm—Coats & Bennett, P.L.L.C.

(57) ABSTRACT

A method is provided for establishing outer loop power control in the transmission of data bursts in an IS-2000A standard CDMA system. The present invention was developed to address the problems of cell sensitivity and capacity degradation that are inherent in transmission of long messages. The present invention is based on the concept of joint re-transmitted message frame combining to adjust the outer loop setpoint. The inner loop power adjustment during the message transmissions uses the setpoint established by the outer loop function. The outer loop memory spans multiple message transmissions in that the setpoint adjustment during transmission of a message depends both on the adjustment performed during the previous message transmission and on the effective message length. The effective message length is reduced at each transmission attempt by means of the message re-transmission combining function. A system and apparatus which control the outer loop power function in accordance with the above-described method are also provided.

28 Claims, 4 Drawing Sheets

SYSTEM AND METHOD FOR DATA BURST COMMUNICATIONS IN A CDMA NETWORK

BACKGROUND OF THE INVENTION

The present invention relates generally to high speed data communications and, more specifically, to a system and method for uplink power control in a third generation (3G) code division multiple access (CDMA) communications system used in conjunction with message retransmission protocols.

In second generation CDMA systems, message size for reverse link data bursts was limited, typically to 8 frames or less, to prevent cell sensitivity degradation. In IS-2000A, a new access channel is defined, the R-CCCH, which permits the transmission of very long data bursts or messages (in excess of 200 frames) at high rate (up to 38.4 kbps) over a reserved, power-controlled channel of the CDMA system. More specifically, the R-CCCH is a reserved (i.e. contention-less) whose framing format includes 5, 10, or 20 msec frames that can be transmitted at 9.6, 19.2, or 38.4 kbps. The R-CCCH is power-controlled by a sub-channel of the forward common power control channel (F-CPCCH). The procedure to reserve the R-CCCH takes place on a different set of common channels, namely the R-EACH and the F-CACH. The R-CCCH was introduced in IS-2000A because it provides significant advantages with respect to the R-EACH, both in terms of capacity and throughput, especially for longer messages (>200 msec).

The data bursts or messages transmitted over the R-CCCH consist of multiple frames. Transmission of the data bursts or messages is made reliable by using transmission repetition protocols such as stop-and-wait or selective repeat. Due to the protocol overhead, however, the retransmission protocol is implemented at message level rather than at frame level. That is, upon successful message decoding, the base station acknowledges receipt of the entire message, but not of any of its constituent frames. Thus, if any frame of the message was unsuccessfully decoded, the entire message must be retransmitted.

After the receipt of the last transmitted frame of the data burst, the base station attempts to re-assemble the message. If the message contains no errors as indicated by the error detecting decoder, the base station transmits an acknowledgment message over a forward control channel to the mobile station. Conversely, if message re-assembly fails (a situation indicative of not having received all the frames correctly), then the base station may take no action. The mobile station waits for the base station acknowledgement and, if the acknowledgment is not received within a given amount of time or if a negative acknowledgment is received, the mobile station retransmits the entire data burst message.

The R-CCCH is power controlled by the base station during message transmission. The base station transmits a sequence of power control bits to the mobile station over the forward power control channel. The polarity of the power control channel bits indicates either an 'up' or 'down' command. The base station periodically estimates the received energy of the reverse control channel and transmits an 'up' command if the energy falls below a signal to noise threshold, and transmits a 'down' command otherwise. The mobile station receives the power control bits and adjusts its reverse control channel transmit power accordingly. The function outlined above is usually called inner loop power control, and it is equivalent to the one normally used for the dedicated traffic channel of IS-95B CDMA systems.

There are some key issues that, unless addressed appropriately, may lead to the degradation of both system capacity and throughput performance of the data burst protocol over the reserved channel. The first key issue is the fact that there is no provision for a selective retransmission procedure on a frame level. Rather, if one or more frames are received in error, message capsule re-assembly fails and the data burst must be retransmitted entirely. Thus, for longer messages, the data burst signal must be received at a signal to noise ratio that is considerably higher than that required for a dedicated traffic channel operating at the same data rate, where the target frame error rate of the traffic channel is the same as the reserved channel target message error rate. Assuming independence of the received frame erasures, the target message error rate (MER) has a relationship to the frame error rate (FER) that is a function of the message size, where N is the number of frames in the message:

$$MER = 1 - (1 - FER)^N \rightarrow FER = 1 - (1 - MER)^{\frac{1}{N}} \approx \frac{MER}{N}$$

The result above indicates that when the message size is equal to 100 frames, for example, the reserved required FER is approximately 100 times smaller than that required for the dedicated channel FER. A required FER ratio equal to 100 corresponds to an increased required signal to noise ratio of 3 to 9 dB, approximately, depending on channel conditions. If the reserved channel sensitivity is much higher than that of the dedicated channels, the data burst transmission will cause a temporary cell sensitivity degradation. That is, the cell maximum path loss (cell size) will shrink by the same amount, possibly causing an outage for all the users near the cell boundaries. Of course, the cell capacity is also momentarily degraded.

A second key issue is the selection of the power control inner loop set point. The inner loop set point required for reliable message detection may depend on channel conditions and on the message size, which may not be known a priori to the base station. Without an outer loop function, the inner loop set point must be set to a conservative value corresponding to the worst case (i.e., to the maximum allowable message size and worst case channel conditions). If the set point is set to a value less than the value corresponding to the worst case, long messages and/or messages transmitted over a poor channel are likely to be retransmitted several times. This may compromise the throughput and capacity of the common channel. However, when the set point is set to a value corresponding to the worst case, considerable capacity is wasted for transmission the of any message with a length less than the maximum length and/or messages transmitted over a favorable channel.

The considerations above clearly demonstrate the advantages that an outer loop function can provide with respect to the throughput and capacity of data burst messages. In particular, the outer loop function can adjust the required inner loop set point, and so achieve the desired MER with the least possible capacity consumption. Conventional outer loop functions, such as the one used for the dedicated channels, are driven by frame erasures or, more generally, by some quality metric of the received frame. That is, they are driven by some small acceptable error rate in an attempt to set the mobile station transmit power to the lowest possible level to support communications. However, this conventional outer loop function, based on an acceptable error rate, cannot be applied to the burst transmission over reserved channels because a single frame received in error will cause the message to be discarded, and require the mobile station's retransmission of the entire message. Thus, there remains a need for improved power control methods suitable for use with message retransmission protocols to adjust the inner loop power control set point.

SUMMARY OF THE INVENTION

The present invention provides a system and method of power control useful for message retransmission protocols to prevent unnecessary degradation of cell sensitivity. A transmitting station transmits a message comprising a plurality of data frames to a receiving station over a reverse common control channel. The receiving station controls the power level of the transmitting station by sending power control commands to the transmitting station during message transmission. The receiving station measures the energy of the received signal and computes a signal to noise ratio, which the receiving station compares to a target signal to noise ratio referred to herein as the power control set point. The receiving station transmits power control bits to the transmitting station to signal the transmitting station to either increase or decrease the transmit power level based on the comparison, and the transmitting station adjusts its transmit power accordingly.

The receiving station re-assembles the message after receipt of the last frame and, it the message contains no errors, transmits an acknowledgement to the transmitting station over a forward control channel. If the message reassembly fails, the receiving station saves correctly received frames in a reassembly cache and waits for the message to be re-transmitted by the transmitting station. After transmitting the message, the transmitting station waits for an acknowledgement from the receiving station for a predetermined time period. If an acknowledgement is not received, the transmitting station repeats the entire message.

At the beginning of each message transmission, the outer loop power control in the receiving station calculates the power control set point used for inner loop power control based on the effective message length. The effective message length is the number of frames that are yet to be correctly received. If the message length is not known, a default value may be assumed for the initial transmission of the message. The power control set point is directly proportional to the effective message length so that the power control set point decreases as the effective message length decreases. The net effect of the inner loop and outer loop power control functions is a reduction in transmit power as the effective message length decreases.

The power control set point used for inner loop power control can be further adjusted on a frame by frame basis during each message transmission. The receiving station decodes each frame as it is received. The receiving station adjusts the power control set point downwardly if the frame is correctly received, and adjusts the set point upwardly if the frame is not correctly received. The step size for upward adjustments may be greater than the step size for downward adjustments.

DETAILED DESCRIPTION OF THE PREFERRED EMBODIMENT

Figure 1:
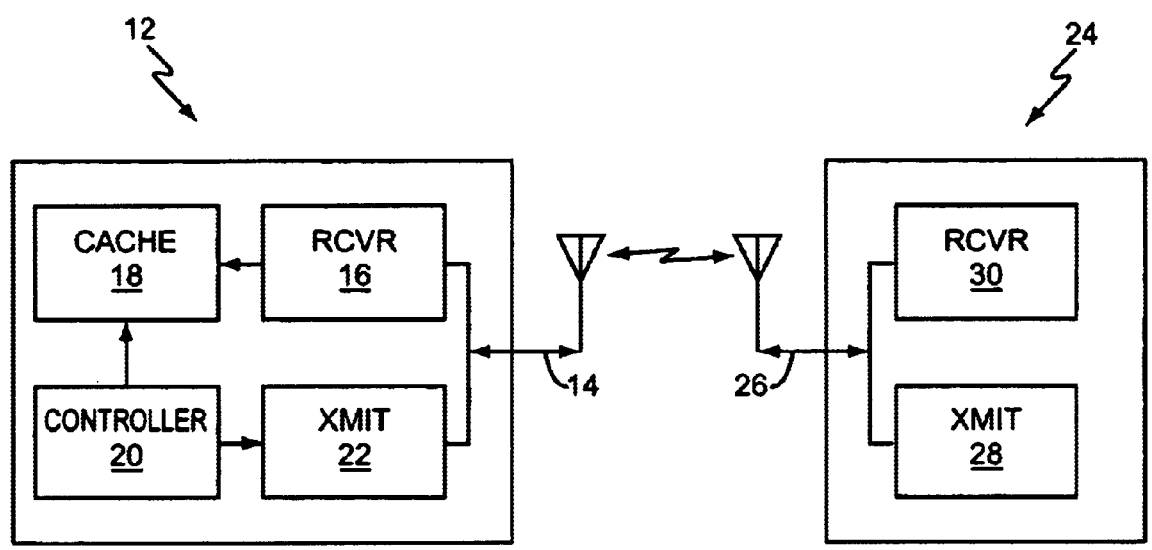
FIG. 1 is a schematic block diagram of the present invention code division multiple access (CDMA) system for communicating bursts of data.

CDMA systems are interference-limited systems. Since all transmitting stations operate at the same frequency, internal interference generated within the system plays a critical role in determining system capacity and voice quality. The transmit power from each transmitting station must be controlled to limit interference while maintaining desired performance objectives, e.g., bit error rate (BER), frame error rate (FER), capacity, dropped-call rate, coverage, etc. One way to achieve this is through power control.

Power control is used in CDMA systems to control the power of signals received at each base station from the mobile stations. It Should be noted that the base station may power control the mobile station, or the mobile station may power control the base station. However, for the sake of clarity, the following example of power control utilizes the example of a base station power controlling a mobile station.

The purpose of power control is to assure that each mobile station served by a particular base station provides approximately the same signal level to the receiver at that sector. In CDMA systems, the system capacity is maximized if the transmit power level of each mobile station is controlled so that its signals arrive at the base station receiver with the minimum required signal-to-noise ratio (SNR) or signal-to-interference ratio (SIR). This minimum SNR is referred to herein as the power control set point.

Two power control mechanisms are employed in conventional CDMA systems: inner loop power control and outer loop power control. The inner loop power control keeps the mobile station as close to its target SNR as possible, whereas outer loop power control adjusts the target SNR for a given mobile station.

To perform inner loop power control, the base station measures the energy of the received signal from the mobile station and computes the SNR of the received signal. The base station compares the computed SNR to the target SNR referred to herein as the power control set point. The base station transmits power control commands to the mobile station that signal the mobile station to either increase or decrease its transmit power level based on the comparison, and the mobile station adjusts its transmit power accordingly. The power control commands typically comprise power control bits. The polarity of the power control bits indicates either an 'up' or 'down' command to the mobile station. Thus, if the received energy falls below the signal to noise threshold, the base station transmits an 'up' command, otherwise, it transmits a 'down' command. The mobile station, upon receiving the power control bits, adjusts its reverse control channel transmit power accordingly.

In addition to inner loop power control, the base station also performs outer loop power control to periodically adjust the power control set point, i.e., the target SNR, used for inner loop power control. The target SNR determines the long term Frame Error Rate (FER), which is a direct measure of link quality and is a key parameter in assuring desired voice quality. The relationship between SNR and FER is nonlinear and varies with vehicle speed and channel conditions. Therefore, it is not sufficient to maintain a desired signal to noise ratio using inner loop power control, but is necessary to control the FER. That is the function of outer loop power control. Outer loop power control compares the actual FER to a desired FER and adjusts the power control set point up or down accordingly to maintain the FER at a desired level.

The present invention is a method of outer loop power control that determines the power control set point for inner loop power control. While not limited to such, the present invention is particularly useful in combination with message retransmission protocol where the receiving station re-assembles a received message after receipt of the last transmitted frame and acknowledges the message if it contains no errors. In broad terms, the outer loop power control method of the present invention determines the inner loop power control set point, e.g., target SNR, based on the "effective length" of the message being transmitted.

According to the present invention, the transmitting station repetitively transmits a message comprising a plurality of frames to the receiving station until all frames have been correctly received by the receiving station. The receiving station saves correctly received frames in a re-assembly cache. At the beginning of each retransmission, the receiving station adjusts the inner loop power control set point based on the "effective message length" of the message being transmitted. The term effective message length refers to the remaining frames yet to be correctly received.

FIG. 1 illustrates the concept of effective message length. In FIG. 1, the receiving station 12 measures the number of frames n in a data burst or message. During the receipt of the message, the receiving station 12 saves only those frames received correctly in a cache. The receiving station controller 20 then compares the number of n frames in the message to the number of correctly received frames k saved in the cache 18. Armed with this data, the receiving station controller 20 may then calculate the effective message length of m frames (i.e. the remaining frames yet to be correctly received), where m=(n−k). The effective message length is reduced at each retransmission by means of a frame combining function.

Figure 2:
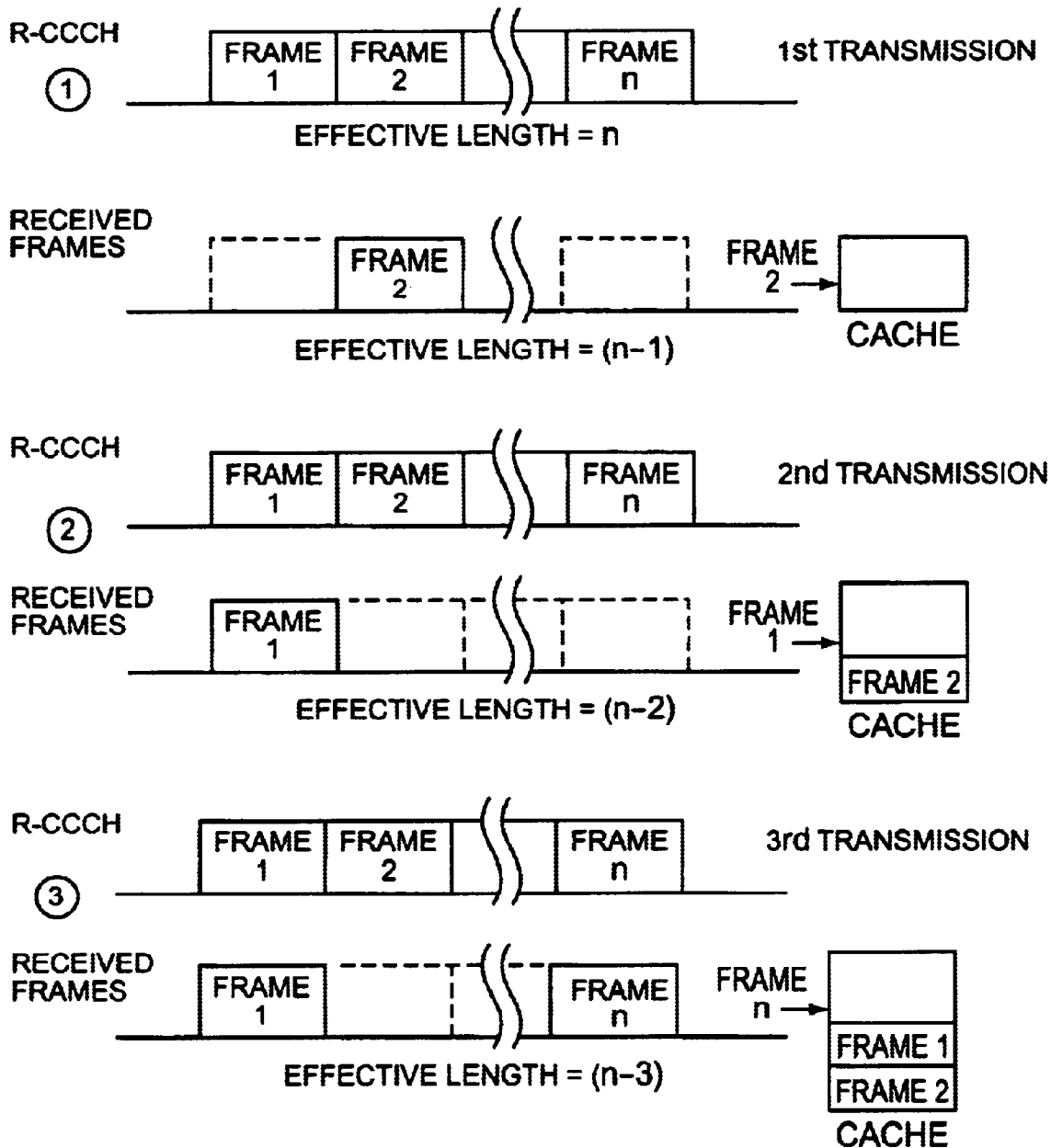
FIG. 2 illustrates the concept of effective message length through frame recombination.

FIG. 2 illustrates the reduction of the effective message length through frame recombination in an exemplary embodiment. In the first transmission, the transmitting station 24 transmits a data burst or message comprising n frames. The receiving station 12 correctly receives frame 2, depicted with solid lines, and saves frame 2 to the cache. Portions of other frames, such as frames 1 and n, depicted with dotted lines, may have also been received, but enough of the frame was missed that recovery of the data is impossible. Therefore, given that the message length is n frames and frame 2 was correctly received, frame 2 is added to the cache and the effective message length after the first transmission is (n−1). After the second transmission of the information stream, frame 1 was correctly received. Therefore, frame 1 is added to cache and the effective message length becomes (n−2). In the third transmission of the information stream, two frames, frames 1 and n are correctly received. However, since frame 1 is already stored in memory, only frame n is added to cache, and the effective message length is reduced by one frame. In this manner, frame recombination reduces the effective message length of the information stream with each subsequent transmission of the information stream.

The effective message length of a data burst or message is used by outer loop power control to determine the inner loop power control set point. In order to adjust the set point, the receiving station 12 selects a target message error rate (MER), which together with the effective message length, is used to calculate a target frame error rate (FER). For the initial transmission, the receiving station sets the effective message length $n_0$ equal to the number of frames contained in the message if known. If n is not known a priori, then the receiving station will set $n_0$ equal to a predefined value, e.g., the expected (average) message length. The receiving station then selects the target message error rate, $MER_0$, and computes the target frame error rate, $FER_0$ as:

$$FER_0 = 1 - (1 - MER_0)^{\frac{1}{n_0}}$$

Finally, the initial inner loop set point is computed as $\eta_0(0)=\eta(FER_0)$, where $\eta$ is an empirical function that may depend on the estimated channel conditions and transmitting station speed. Once the target FER is computed, a target signal to noise (S/N) threshold, or set point, in response to the FER may then be calculated. Thus, as the effective message length decreases (i.e. more frames are correctly received), so too does the set point. In a preferred embodiment of the invention, the receiving station adjusts the inner loop power control set point at the beginning of each message re-transmission.

Additionally, while receiving the message, the outer loop power control may adjust the inner loop power control set point on a frame-by-frame basis based on a measure of the frame quality. The frame quality metric may simply be whether the frame is received correctly. Thus, if a frame erasure occurs, the set point is increased, and conversely, if the frame is correctly received, the receiving station stores the good frame and decreases the set point. These modifications permit a system to respond to increases in noise and interference levels, or to fading, or to signal amplitude changes due to the movement of the transmitting station 24. The step size for upward adjustments is typically larger than the step size for downward adjustments. The step sizes may be fixed, or may be dependent on the effective message length.

Figure 3A:
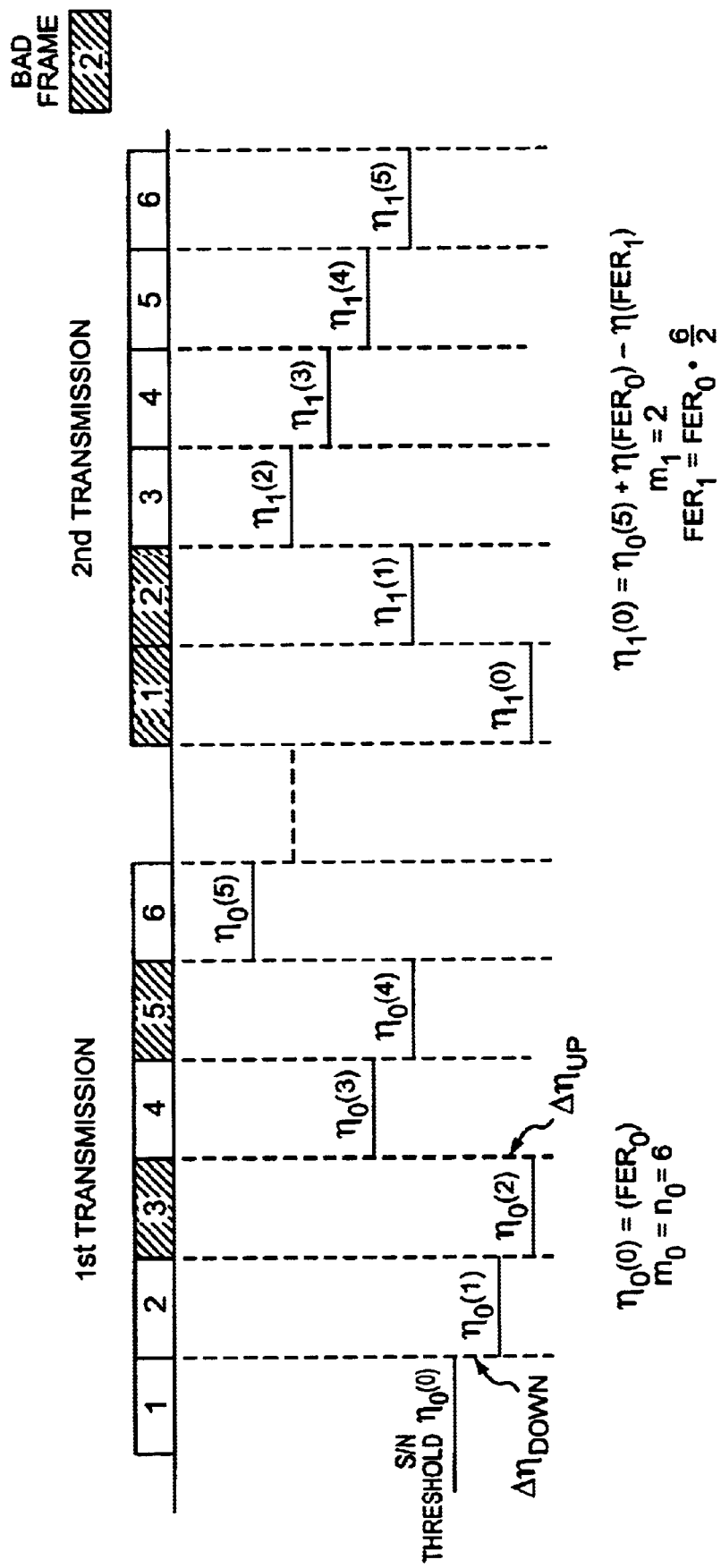
FIG. 3a illustrates one embodiment of the present invention outer loop power control.

FIG. 3a illustrates one embodiment of outer loop power control used by the present invention. An initial S/N target threshold $\eta_0(0)$ is calculated based on a target FER, which is dependent on the message length. As stated above, the initial threshold uses either a known or estimated message length. In this scenario the message length is six frames (m=n=6). The first frame of the first transmission is received correctly and the S/N threshold is reduced a fixed step size. Likewise, the second frame is received correctly and the threshold is reduced by a fixed amount. The third frame is not received correctly and the S/N threshold is increased a fixed step size. Typically, the step size up is larger than the step size down. In some aspects of the invention the target FER has a 1% error rate, so the up step size is 99% greater than the down step size.

At the end of the first transmission four frames have been received correctly, hence, the effective message length is two frames. Further, the FER associated with a message length of two frames ($FER_1$) is lower than the initial FER. As a result, the initial S/N threshold at the beginning of the second transmission, $\eta_1(0)$, is considerably lower than $\eta_0(0)$. Thus, the S/N threshold varies in fixed steps sizes from the initial starting point at the beginning of the transmission in response to whether a frame was correctly received or not.

Figure 3B:
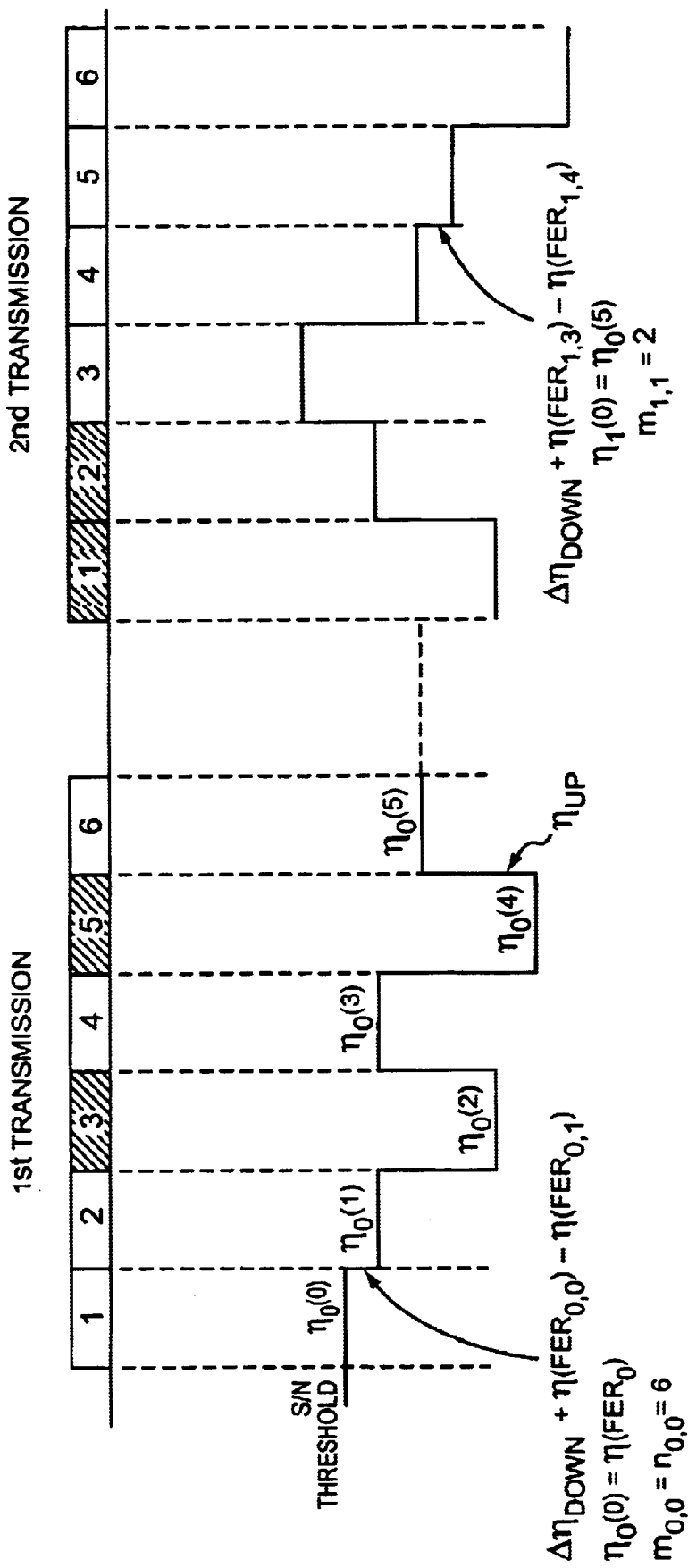
FIG. 3b illustrates another embodiment of the present invention outer loop power control.

FIG. 3b illustrates another embodiment of outer loop power control used in the present invention. An initial S/N target threshold $\eta_0(0)$ is calculated based on a target FER, which is dependent on the message length, As in the previous embodiment, the initial threshold uses either a known or estimated message length. Again, the message length is six frames (m=n=6). The first frame of the first transmission is received correctly and the S/N threshold is reduced, however in this case, the step size is not fixed. In fact, the step size calculation involves a fixed portion, $\eta_{DOWN}$, because the previous frame was received correctly, and a variable portion, $\eta(FER_{0,0})-\eta(FER_{0,1})$, because the effective message length was reduced. It should be noted that the fixed portion of the step size is similar to the fixed step size described above in the explanation of FIG. 3a.

Continuing with respect to FIG. 3b, the second frame is received correctly and the threshold is reduced. Here, the variable portion of the step size increases as the effective message length gets smaller. Note that the invention need not necessarily decrease the step in a nonlinear way as the effective message length decreases, but such a formulation promotes the minimal degradation of cell sensitivity. Next, frame 3 is received incorrectly, the effective message length remains the same, and the S/N threshold increases a fixed step size, as explained in FIG. 3a.

At the end of the first transmission, four frames have been received correctly and the effective message length becomes two frames. Since the S/N threshold is recalculated after the receipt of each frame, there is a much smaller difference in the change of the S/N threshold at the start of the second transmission than was observed in the embodiment of FIG. 3a. Further, due to the incorrect receipt of the first two frames of the message, the S/N threshold varies in fixed steps sizes from the initial starting point at the beginning of the transmission. Note here that the S/N threshold is reduced sharply after the receipt of the third frame, however, the S/N threshold is only reduced a small amount after the receipt of the fourth frame. This is because frame 4 was received in the first transmission and, as a result, the effective message length does not change. Alternately stated, $\eta(FER_{1,3})=\eta(FER_{1,4})$, thus only the fixed portion of the step size remains.

A comparison of the embodiments of FIGS. 3a and 3b shows that the S/N threshold tracks the receipt of correct frames more closely when the effective message length is recalculated after each frame. A lower overall threshold setting results in lower transmit power levels, which means that cell sensitivity degradation is reduced and uplink capacity is increased.

Regardless of the embodiment, inner loop power corrections can be applied as is well known in the art, once the S/N thresholds have been established. That is, the receiving station measures the SIN of the first received message and compares the measured S/N to the target S/N determined by the open loop. In response to the comparisons, the receiving station increases or decreases the inner loop set point, and transmits the power control bits to either raise or lower the transmit power level to obtain the target S/N.

Note that after the first message transmission attempt, the message length can be reliably estimated, in case it was not known a priori. For example, the instant when receiver demodulating element goes out of lock is a reliable indication that the transmitting station 24 has terminated the message transmission. Since the receiving station scheduled the start time of message transmission, the receiving station can compute the message capsule duration, and consequently its size n.

Further, note that $MER_k$, where K is the $K^{th}$ transmission attempt, can be set equal to $MER_{k-1}$, or it can be set based on residual capacity considerations. In one embodiment of this invention $MER_k$ can be computed recursively, as follows:

$$MER_k = \alpha \cdot MER_{k-1} = \alpha^k \cdot MER_0$$

where $\alpha \leq 1$. Also note that in this case the $FER_k$ can be obtained recursively using the following approximation:

$$FER_K = \frac{MER_K}{MER_{K-1}} \cdot \frac{n_{K-1}}{n_k} \cdot FER_{K-1} = \alpha \cdot \frac{n_{K-1}}{n_k} \cdot FER_{K-1}$$

If the system is operating under light load and the message latency requirements are stringent, it may be desirable to select a lower value of $MER_0$ and a value of $\alpha$ closer to unity. On the other hand, if the system is operating under heavy load and capacity is at a premium, $MER_0$ could be set to a relatively large value and decrease the value of $\alpha$. In doing so, the R-CCCH sensitivity for the first transmission attempt is greatly reduced, while the average message latency is controlled by the setting of $\alpha$.

Thus, a system and method have been provided which demonstrate the operation of inner and outer loop power controls to efficiently permit the transmission of long bursts of data in a CDMA communications system. The system recombines frames to "shorten" the message, and latency is traded to preserve cell sensitivity. Also, while the R-CCCH is typically mentioned herein as the channel used to control power, it is understood that any reverse common channel could be used to perform the same function. Therefore, other variations and embodiments of these concepts, beyond the exemplary embodiment described above, will occur to those skilled in the art.

What is claimed is:

1. A method of outer loop power control using transmission repetition protocols, the method comprising:
   determining an effective message length of a message being transmitted from a transmitting station to a receiving station based on an amount of said message not yet correctly received; and
   computing a power control set point for inner loop power control based on the effective message length.

2. The method of claim 1 wherein computing the power control set point for the inner loop power control based on the effective message length comprises:
   calculating a target frame error rate (FER) based on a selected message error rate (MER) and the effective message length; and
   computing said power control set point for the inner loop power control based on the effective message length and the target FER.

3. The method of claim 1 wherein the message comprises a plurality of data frames repetitively transmitted over a common channel, and wherein computing said power control set point for the inner loop power control based on the effective message length comprises computing said power control set point before each message retransmission.

4. The method of claim 1 further comprising saving correctly received data frames in a reassembly cache.

5. The method of claim 4 wherein computing said power control set point for the inner loop power control based on the effective message length comprises computing said power control set point based on a number of the correctly received data frames saved in the reassembly cache.

6. The method of claim 4 further comprising adding the correctly received data frames to the reassembly cache, that are not already saved in the reassembly cache after each message transmission.

7. The method of claim 6 further comprising reassembling the message using the correctly received data frames saved in the reassembly cache.

8. The method of claim 2 wherein computing said power control set point for the inner loop power control based on the target FER comprises computing said target FER based on said selected MER and the effective message length m before each message retransmission.

9. The method of 8 claim further comprising:

saving correctly received data frames in a reassembly cache; and determining the effective message length m by comparing a total message length n with the number of correctly received data frames k saved in the reassembly cache after each of the message transmissions, such that m=(n−k).

10. The method of claims 9 wherein the message length n is set equal to an actual number of data frames in the message.

11. The method of claim 9 wherein the message length n is set to a predetermined value if an actual number of data frames in the message is not known a priori.

12. The method of claim 1 further comprising:

decreasing the power control set point during message transmission in response to each correctly received data frame.

13. The method of claim 12 further comprising:

increasing the power control set point during message transmission in response to each incorrectly received data frame.

14. The method of claim 1 further comprising:

updating the effective message length during retransmission of said message in response to receipt of a data frame of said message; and adjusting the power control set point by a variable step size during message retransmission, wherein the step size is varied based on the updated effective message length.

15. A wireless communications apparatus operating on a code division multiple access principle, comprising:

a receiver for receiving a message transmitted from a transmitting station;

a transmitter for transmitting at least power control information to said transmitting station;

a controller controlling the operation of said transmitter and programmed to:

determine an effective message length of said message based the amount of said message not yet correctly received; and compute a power control set point for inner loop power control based on the effective message length.

16. The apparatus of claim 15 wherein said controller is further programmed to:

calculate a target frame error rate (FER) based on a selected message error rate (MER) and the effective message length; and compute said power control set point for the inner loop power control based on the target FER.

17. The apparatus of claim 15 wherein the message comprises a plurality of data frames repetitively transmitted over a common channel, and wherein the controller is further programmed to compute said power control set point for the inner loop power control based on current effective message length.

18. The apparatus of claim 15 further comprising a reassembly cache for saving correctly received data frames.

19. The apparatus of claim 18 wherein said controller is further programmed to compute said power control set point for the inner loop power control based on the number of the correctly received data frames saved in the reassembly cache.

20. The apparatus of claim 18 wherein said controller is further programmed to add correctly received data frames to the reassembly cache, that are not already saved in the reassembly cache, after each message retransmission.

21. The apparatus of claim 20 wherein said controller is further programmed to reassemble the message using the correctly received data frames saved in the reassembly cache.

22. The apparatus of claim 16 wherein said controller is further programmed to compute said target FER based on said selected MER and the effective message length m before each of the message retransmissions.

23. The apparatus of claim 22 further comprising:

a reassembly cache for saving correctly received data frames; and wherein the controller is further programmed to determine the effective message length m by comparing a total message length n with the number of correctly received data frames k saved in the reassembly cache after each of the message transmissions, such that m=(n−k).

24. The apparatus of claim 23 wherein the message length n is set equal to an actual number of data frames in the message.

25. The apparatus of claim 23 wherein the message length n is set to a predetermined value if an actual number of data frames in the message is not known a priori.

26. The apparatus of claim 15 wherein the controller is further programmed to decrease the power control set point during message transmission in response to each correctly received data frame.

27. The apparatus of claim 26 wherein the controller is further programmed to increase the power control set point during message transmission in response to each incorrectly received data frame.

28. The apparatus of claim 15 wherein the controller is further programmed to:

update the effective message length during retransmission of said message in response to receipt of a data frame of said message; and adjust the power control set point by a variable step size during message retransmission, wherein the step size is varied based on the updated effective message length.

* * * * *